April 14, 1970  W. W. OELKE ET AL  3,506,430

GLASS SHEET BENDING MOLD

Filed Aug. 18, 1966

INVENTORS
Waldemar W. Oelke,
BY Glen J. Lehr and
Richard A. Herrington
Nobbe & Collins
ATTORNEYS

United States Patent Office 3,506,430
Patented Apr. 14, 1970

3,506,430
GLASS SHEET BENDING MOLD
Waldemar W. Oelke, Rossford, Glen J. Lehr, Oregon, and Richard A. Herrington, Toledo, Ohio, assignors to Libbey-Owens-Ford Company, Toledo, Ohio, a corporation of Ohio
Filed Aug. 18, 1966, Ser. No. 573,354
Int. Cl. C03b 23/02
U.S. Cl. 65—287
3 Claims

ABSTRACT OF THE DISCLOSURE

A glass sheet bending mold with a metal body having a curved shaping surface. A porous insulating layer of felted and sintered randomly interlocked metal fibers covers the shaping surface to protect the glass sheet from chill cracking.

---

The present invention relates to improvements in bending molds and more particularly to an improved cover material for insulating the shaping surface of a bending mold.

Curved sheets of glass are widely used as glazing closures, particularly as windows in vehicles such as automobiles or the like. Styling of the present day automobiles dictates that the curved sheets must be bent to rather precisely defined curvatures which are determined by the size and shape of the opening in which they are to be mounted.

One way of commercially producing curved glazing closures of the above character is to heat flat glass sheets to a temperature corresponding substantially to the softening point of the glass and apply pressure to both major surfaces of the sheet by means of a pair of oppositely disposed complementary shaped male and female pressing members. The pressing members will shape the flat glass into its desired curvature. However, this procedure has presented certain problems. First, when forced into contact with the heated sheets, the mold parts, which are usually constructed of a solid metal or similar material capable of withstanding the stresses encountered during the bending operation, are relatively cool as compared to the glass which at this point has been heated to a temperature of approximately 1200° F. Upon contacting the sheets, the cool shaping surfaces tend to adhere to or to cause chill cracking in the contact areas of the heated sheet.

Various covers have been proposed to insulate the surfaces of the pressing members from direct contact with the heated glass sheet. One of the prior art insulating covers is disclosed in United States Patent No. 2,560,599, issued to Joseph D. Ryan, which suggests the use of a plurality of layers of woven fiberglass cloth impregnated with a high heat resistant plastic material which fill the interstices of the woven fiber glass cloth. Other types of covering materials proposed are knit and woven fiberglass fabrics disclosed in U.S. Patent Nos. 3,148,968 and 3,223,-504 issued to Cypher et al.

The insulating cover disclosed by Ryan has met with considerable success in use with a continuous uninterrupted shaping surface of a mold. However, in an effort to meet the increasingly higher standards of commercial requirements, many glass sheets are bent utilizing one continuous shaping surface and one ring-type shaping surface to minimize the extent of contact within particularly the viewing area of the sheet with regard to at least one shaping surface. Of course, as the contact area is decreased, the pressure per unit area on a ring-type shaping surface is increased and is fairly high at the original contact points between the glass sheet and the ring-type surface. This has resulted in leaving an impression of the insulating cover, such as the knit or woven fiberglass fabric covers of the prior art, particularly at the major contact points of the ring-type shaping surface.

The primary object of this invention is to provide a mold having an improved insulating cover on the shaping surface thereof.

Another object is to provide an improved insulating cover for the shaping surface of a mold which is formed of felted, randomly interlocked metallic fibers bonded together to produce a porous structure.

Other objects and advantages of the invention will become more apparent during the course of the following description when read in connection with the accompanying drawings.

In the drawings, wherein like numerals are employed to designate like parts throughout the same:

Although not limited to any particular apparatus, the present invention has been illustratively shown in combination with a continuous bending furnace for producing curved glass sheets in relatively large quantities, such as would be required in the commercial production of glazing closures for automobiles and the like.

Figure 1:
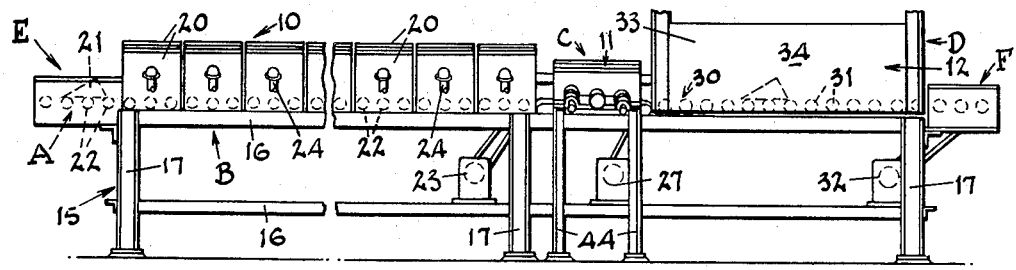
FIG. 1 is a side elevational view of a bending and tempering apparatus having the features of the present invention incorporated therein.

In FIG. 1 of the drawings, there is shown a bending and tempering apparatus for producing bent and tempered glass sheets by a continuous commercial process. The apparatus includes a continuous conveyor system A operable to carry sheets successively along a predetermined path through a heating section B having means 10 for heating the glass sheets to the desired temperature, a bending section C having means 11 for forming the sheets to the desired curvature, and a tempering section D having means 12 for rapidly reducing the temperature of the heated sheets to produce the desired temper therein.

These heating, bending and tempering means 10, 11 and 12, respectively, are located in aligned relationship along a predetermined path defined by the conveyor system A which thereby carries the sheets in succession through each of the aforementioned areas from a loading area E at one end of the path to an unloading area F at the opposite end of the path. The heating, bending and tempering means, together with the conveyor system A, are mounted on a supporting framework 15 comprising upper and lower rails 16 extending longitudinally along the path at opposite sides thereof and supported on vertically disposed pedestals 17.

As herein provided, the heating means 10 comprises heating units 20 disposed on opposite sides of the path of sheet movement and having working surfaces (not shown) extending upwardly from said path in planes substantially parallel to the plane in which the sheets are supported. Thus the sheets 21 are moved along the path and between the heating units 20 on a roller-type conveyor 22 which forms a part of the conveyor system A and extends through the loading area E and the heating section B. This conveyor is operated by a suitable drive means 23 at a rate of speed commensurate with desired heating of the glass.

In the present instance, a number of heating units 20 are located in side by side relation along each side of the path of sheet movement to direct heat against the surfaces of the sheets as they are carried through the heating section B; the units being individually connected to a source of supply by pipes 24 and regulated to progressively bring the sheets to the proper bending temperature as they are moved along the path. While various heating devices could be utilized in the heating units, preferably to avoid contacting the surfaces of the sheets, the units are designed to direct heated gases which escape through the opposed faces of the units to impinge on the surfaces of the sheets passing thereby. The units 20 thus provide cushions of hot gases on which the sheets float in the desired plane which is substantially vertically disposed.

After being properly heat softened and upon emerging from the heating section B, the sheets 21 are received on a second conveyor 25 which carries the sheets through the bending section C and into the area of the bending means 11 which shapes each sheet to the desired curvature. The conveyor 25 comprises an endless belt or band 26, preferably of stainless steel or similar material adapted to withstand the heat to which the belt is subjected, which receives the lower edge of the heated sheet. The belt 26 is operated endwise by a suitable drive means 27 to advance the sheets past the bending means 11 and into the cooling or tempering section D. As the second conveyor 25 moves the sheets into the bending area C between bending means 11, they are retained in a substantially vertical position by suitable guide means, such as a bar 28, having a nonabrasive surface for contacting one surface of the sheets.

After each glass sheet 21 is bent to the desired curvature, it is moved from between the bending means 11 by the second conveyor 25 and advanced to the tempering section D. The glass sheets are then received on a third conveyor 30, which is a part of the conveyor system A and includes a plurality of spaced rollers 31 driven in common by a power source 32. In the tempering section of the apparatus, the heated bent glass sheets are again supported on edge on the conveyor rollers 31 and by cushions of cooling fluid, such as air, forced between the surfaces of the sheet and the adjacent cooling means. By regulating the temperature and velocity of air moving past the sheet, the rate of cooling may be regulated to produce the desired temper in the glass.

As herein provided, the cooling means 12 include blastheads 33 (only one being shown) disposed on opposite sides of the path of the moving sheet. The blastheads each comprise a plenum 34 having a surface (not shown), facing the path of the moving sheet, which is provided with a plurality of openings. Pressurized cooling fluid, such as air, is forced into the plenums and passes through the openings against the respective surfaces of the sheet. However, it will be understood that the vertical annealing lehr could be employed as the cooling means in lieu of the blastheads 33 if desired.

Figure 4:
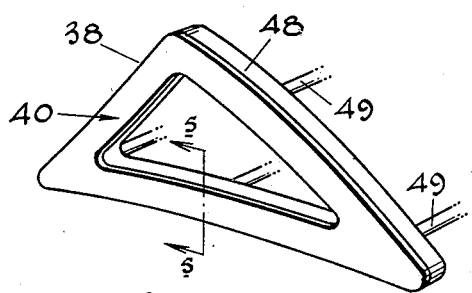
FIG. 4 is a perspective view of the female mold shown in FIG. 2.
Figure 5:
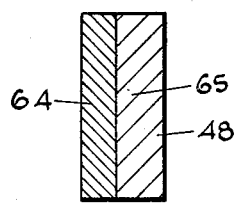
FIG. 5 is a vertical sectional view taken along line 5—5 of FIG. 4.

In general, the bending means 11 includes a shaping mold 36 comprising two mold parts 37 and 38, one disposed on each side of the path of sheet movement, and movable relative to one another toward and away from the path thereby to press the heated sheets between the complemental male and female shaping surfaces 39 and 40 formed on the opposed faces of the mold parts. To this end, the mold parts 37 and 38 are carried by support means 41, which includes for each mold part a platform 42 slidably mounted on a base 43 carried by pedestals 44 forming a part of the frame 15. Each mold part is secured to a base plate 45 which is bolted as at 46 to a mounting plate 47 vertically disposed at the forward end of each platform 42. In the present embodiment, the mold part 38, as in FIG. 4, is formed as a ring-type element 48 that is supported by posts 49 on the respective base plate 45.

To carry the mold parts 37 and 38 between an open position in which they are spaced apart on opposite sides of the path and a closed position in which the mold parts are in close proximity and adjacent the path, each platform 42 is slidably guided on the base 43 for linear movement along a path extending substantially perpendicular to the path of sheet movement. And, in the illustrated embodiment wherein the sheets are supported in a plane inclined to the vertical, the paths along which the platforms are moved is also substantially perpendicular to the supported plane of the sheets.

For these purposes, each platform 42 is provided with bushing members 50 along its opposite sides which are slidable along parallel rods 51 mounted in the upper ends of posts 52 forming parts of the base 43 at the opposite sides of the platforms.

Each of the platforms 42 is reciprocated by a double-action cylinder 53 which is mounted on the base 43 by a bracket 54 and a piston rod 55 which at its free end is attached to the mounting plate 47 on the respective platform by a clevis and pin coupling 56. The direction of fluid pressure to cylinder 53 is selectively admitted thereto through either the pipe 57 or 58.

Figure 2:
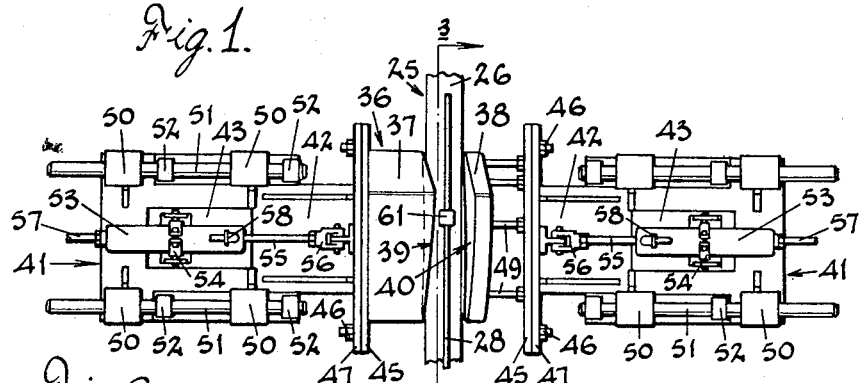
FIG. 2 is a plan view of the bending area of the apparatus shown in FIG. 1.

In operation, a glass sheet 21 is moved from the heating section B into the bending section C between the respective shaping surfaces of the bending means 11 by the second conveyor 25. As the sheet approaches the area between the shaping surfaces of mold parts 37 and 38, the leading edge thereof engages an arm 60 of a sensing device 61 carried by the guide bar 28. The device activates suitable electric controls (not shown) for supplying fluid pressure to the head ends of the cylinders 53 through pipes 57 to move the shaping surfaces from a first position, such as shown in FIG. 2, spaced from the opposed surfaces of the sheet to be bent, to a second, more adjacent position wherein the mold part 38 is located substantially below the bar 28.

Figure 3:
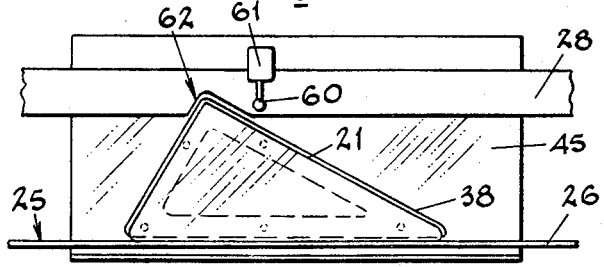
FIG. 3 is a view taken along line 3—3 of FIG. 2.

During the movement of the mold parts toward each other, the sheet continues its movement along the path until it reaches a point where the guide bar 28 is provided with a notch 62. Upon reaching the notch 62, the belt 26 of the second conveyor 25 is stopped and, as the sheet begins to fall toward one of the shaping surfaces, in the illustrated embodiments the shaping surface 40 of mold part 38, the mold parts are moved from the said second position into contacting engagement with the opposed surfaces of the sheet to press the sheet to the contour of the shaping surfaces. As viewed in FIG. 3, it will be apparent that in moving into the pressing position, the upper end of mold part 38 will pass through the notch 62 of the bar 28. Thereafter the mold parts are moved away from the path a short distance by applying fluid pressure to the pipes 58 of cylinders 53 and at the same time the power source 27 driving the second conveyor belt 26 is activated to begin movement of the sheet from between the shaping surfaces. After the bent sheet has moved a short distance to be supported by the guide bar 28 beyond the notch 62, the mold parts are rapidly moved to the first position and the sheet is advanced into and through the tempering section.

As noted above, in the bending sequence, when the mold parts engage the surfaces of the sheets, which are then at the elevated temperature, the relatively cool surfaces have a tendency to adhere to the contacted areas of the heated sheet. Furthermore, the extreme temperature differential between the mold parts and the heated sheet has adverse effects on the glass causing chill cracks or other imperfections in the contact areas. To prevent fusing of the mold to the sheet and to reduce chill cracking of the glass, the sheet engaging surfaces of the mold parts are covered with a heat resistant and insulating layer or cover 64, which reduces the rate of heat transfer between the mold part and the sheets. In the illustrated embodiment, the cover is secured to the rail 65 of the ring-type element 48 of mold part 38 by a suitable adhesive. If desired, the cover may be bolted to the mold surface.

As was indicated above, various types of covers have been proposed. However, due to the continuing demand of higher standards in commercial requirements of bent glass sheets, most of the insulating covers heretofore proposed have presented problems in meeting the commercial requirements of bending glass sheets. According to the invention, there is provided an improved insulating cover which is capable of bending glass sheets without producing many defects in the finished unit, such as distortion and chill cracking.

In the broadest aspect, the invention contemplates forming the insulating cover with a metallic material having a porous structure and a generally flat surface for engaging the surface of the sheet to be bent. The cover of the present invention includes a fiber metal material having a randomly interlocked structure of metallic fibers which are pressed and sintered to produce a bonded structure at all points where the fibers touch each other. The resultant structure is a porous material having the intersected areas bonded together similar to a weld process. One material which has been found to be of considerable advantage is Feltmetal, which is a product commercially available from the Huyck Equipment Company, Melford, Conn.

In the preferred structure, the interlocked fiber metal structure has a density (percentage of metal in the total piece volume) ranging from 20 to 40%, due to the pressing action, with the metal being stainless steel, copper or bronze or any desired alloy composition. The above structure has extremely high insulating capabilities and at the same time has a flat surface for contacting the glass sheet.

The preferred material is a stainless steel having a density of 30%. This structure results in a porous member having an average pore size of 16 microns with less than 1% of the pores in excess of 35 microns and 80% of the total pore volume being within the range of 6 to 28 microns.

Experimental runs for bending ventilator-size glass sheets in a continuous process, such as outlined above, and with a cover 64 of one-quarter inch thickness on the mold part 38, has resulted in producing bent ventilator parts having very little, if any, distortion present in the finished sheet and virtually eliminating the problem of chill cracking of the glass and at the same time there was no indication of wear on the porous metal cover.

As can readily be appreciated, according to the invention there is provided an improved cover formed of metal which has all the attendant advantages of metal and at the same time has superior insulating qualities.

In the illustrative embodiment, the ring-type structure 48 of the mold part 38 has been shown to be covered with a porous metal material and the continuous surface of the mold part 37 has a cover (not shown) of fiber glass cloth material since the major pressure is applied to the female ring-type mold. However, it is considered within the spirit of the invention to cover the shaping surfaces of both mold parts 37 and 38 with the porous metal cover if desired.

It is to be understood that the form of the invention herewith shown and described is to be taken as a preferred embodiment of the same, and that various changes in the shape, size and arrangement of parts may be resorted to without departing from the spirit of the invention.

We claim:

1. A bending mold for use in shaping heat softened glass sheets, comprising a metal body portion having a shaping surface contoured to conform to the curvature desired in said sheet, and a porous insulating layer on said shaping surface adapted to protect said sheet from chill cracking due to heat transferred from the sheet to the metal mold, said insulating layer consisting of a sheet of felted and sintered randomly interlocked metal fibers with a density in the range of 20% to 40% and pore sizes in the range between 6 and 35 microns.

2. A mold as defined in claim 1 in which the density of said layer is approximately 30% and the average pore size is around 16 microns.

3. A mold as defined in claim 1 in which said fibers are of stainless steel and said sheet is approximately ¼ inch thick.

References Cited

UNITED STATES PATENTS

| 3,298,809 | 1/1967 | Barch et al. | 65—273 XR |
| 3,328,151 | 6/1967 | Richardson | 65—287 |

S. LEON BASHORE, Primary Examiner

S. R. FRIEDMAN, Assistant Examiner

U.S. Cl. X.R.
65—106, 374